Oct. 22, 1946.   C. N. KAHL   2,409,868
PISTON ASSEMBLY
Filed Jan. 29, 1944   2 Sheets-Sheet 2
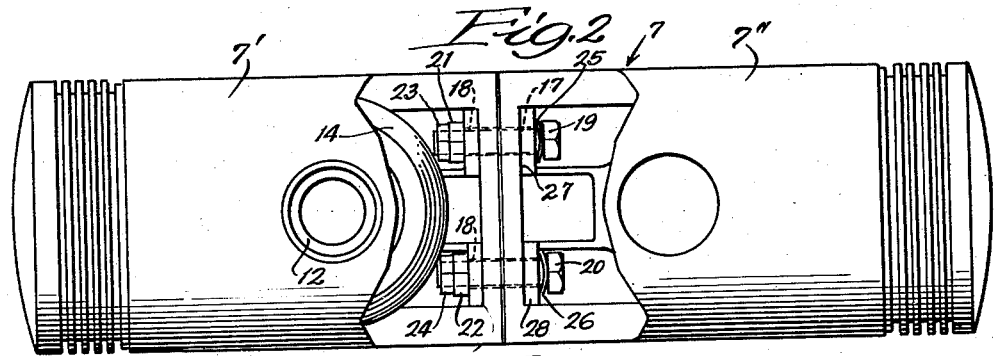
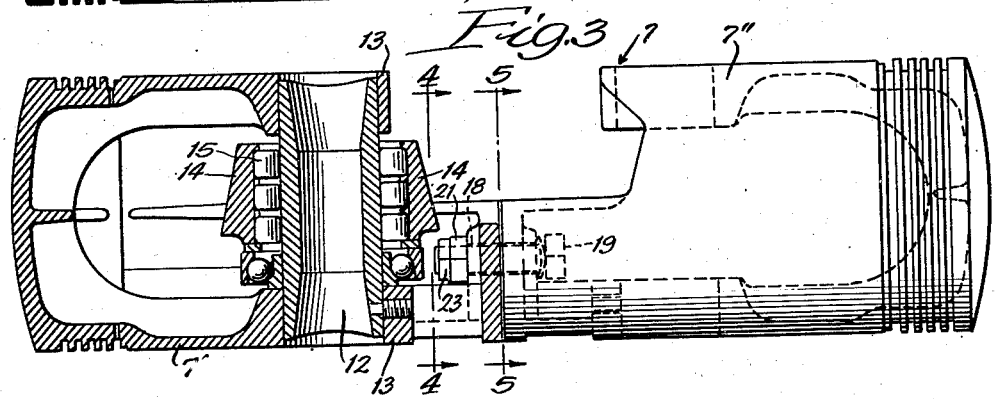
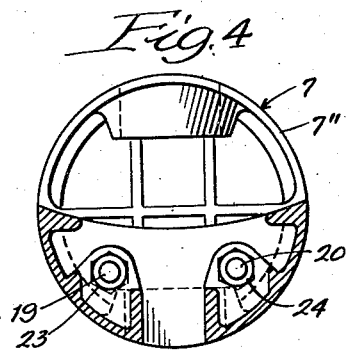 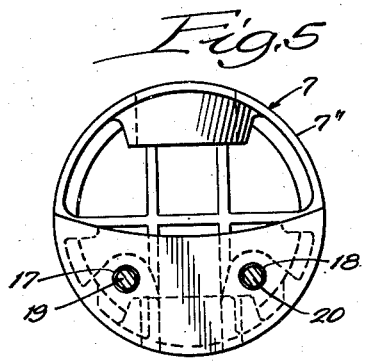
Inventor:
Charles N. Kahl,
By Rummler Rummler & Davis
Attorneys.

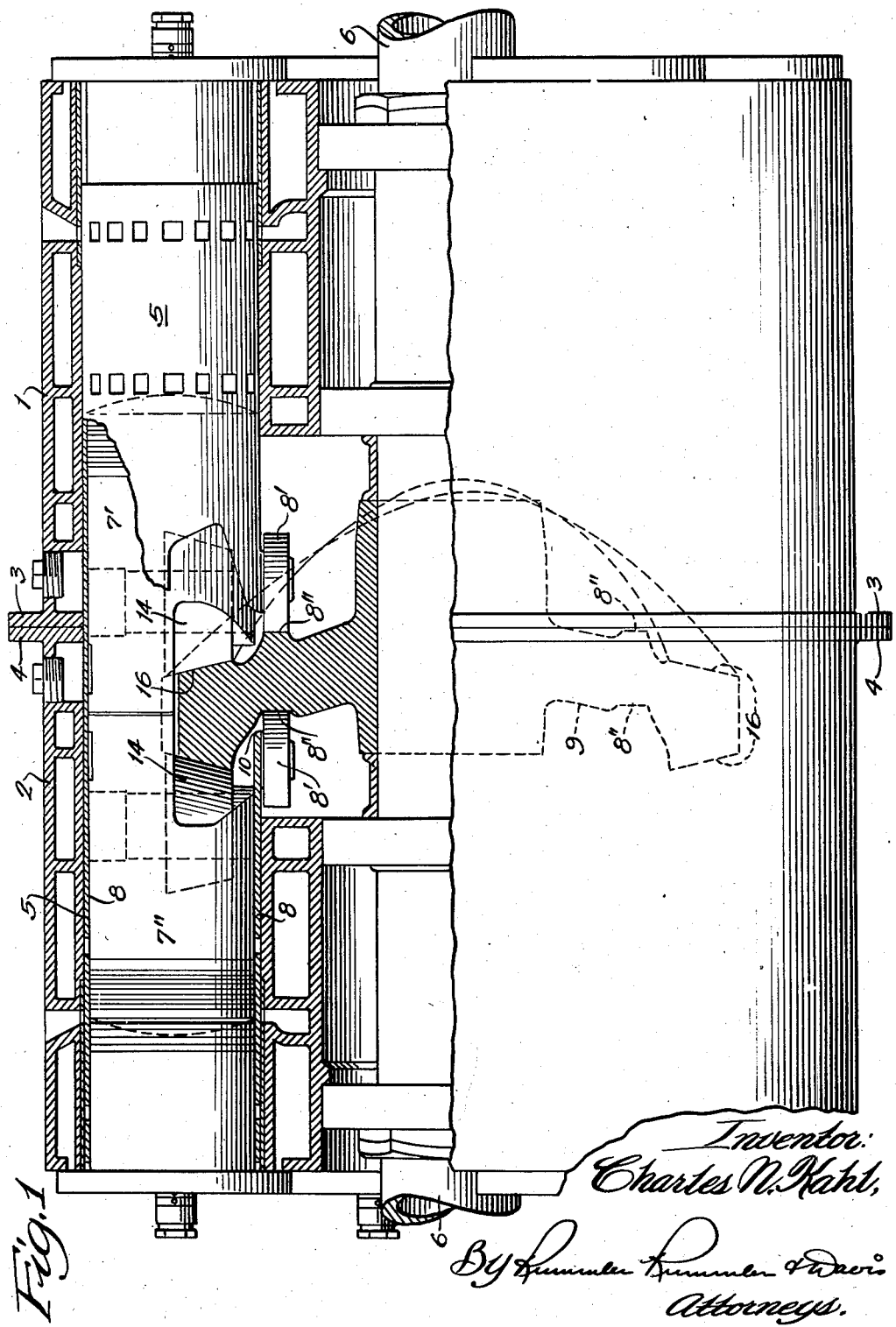

Patented Oct. 22, 1946

2,409,868

UNITED STATES PATENT OFFICE 2,409,868

PISTON ASSEMBLY

Charles N. Kahl, Jacksonville, Ill., assignor of one-half to Lee A. Sullivan, Jacksonville, Ill.

Application January 29, 1944, Serial No. 520,172

2 Claims. (Cl. 309—4)

This invention relates generally to engines of the cam type wherein energy is supplied to a shaft by piston force applied camwise to a wabble plate thereon from appropriately energized cylinders disposed parallel with the shaft; and particularly to improvements in a double-headed or ended piston. The present invention is a continuation-in-part of my copending application Serial No. 401,243, filed July 5, 1941, now Patent 2,398,378, April 16, 1946 for Engines.

Heretofore double-ended or double-headed pistons have generally been made as a single unit and were non-separable, hence adjustment of the double-ended pistons with respect to the rollers and cam tracks on the wabble plate was not possible. The only permissible adjustment was a manual adjustment of the rollers which form a part of the piston with respect to the cam track. This adjustment was rarely satisfactory if the thickness of the cam track varied because of excess wear in spots. Also no variable was provided for in the event of expansion of the wabble plate or rollers because of heat generated from operation of such parts. Because of the combination of inertia and explosion or compression forces acting upon the piston, the pressure between rollers and the piston cannot be uniform. Since the resultant pressure in a single piece piston must vary and change from one side of the cam to the other during the cycle, there are times, in a one-piece piston or a rigidly connected two-piece piston, when there is no pressure between the individual rollers and the cam track of the wabble plate.

In any wabble plate mechanism, the degree of angularity of the cam track of the wabble plate must change throughout the cycle. In order to produce a uniform speed of rotation of the crankshaft, the rotation of the rollers throughout the cycle must be a variable one. Since these two conditions are inherent in all engines of this type, there is a condition created wherein there is a phase where there is no pressure existing between the rollers and the cam track. This occurs when the roller must change its rotational velocity in order to maintain rolling contact with the cam. The result of this condition is a skidding action of the roller on the cam track instead of a rolling one causing excess wear of both the roller and the cam track on the wabble plate. If any clearance is provided, whether intentionally or otherwise, between the cam and its roller followers, it would tend to increase stresses, cause knocks, beat out cam trails, Brinell and fatigue bearings, pins and tension members of pistons.

It was to overcome these inherent defects in existing engines, and to produce a double-ended piston having rollers incorporated therein which are arranged to maintain a positive contact at a uniform minimum pressure on the cam track at all times, and to simplify and reduce the number of parts employed in engines of this character that the present invention was conceived.

The main objects of this invention are to provide a new and improved double-ended piston; to provide a double-ended piston of this character which will insure positive frictional contact between the rollers of the pistons and the cam track of a wabble plate at all times; to provide a double-ended piston of this character which is provided with yieldable means to allow for expansion and contraction of each end of the piston with respect to the cam track in the event of any inaccuracy of the cam track thickness or because of expansion or contraction of the wabble plate and its cam track and the rollers due to temperature changes in the metal during rotation thereof; to provide a double-ended piston of this character wherein positive frictional contact is had at all times between the rollers and the cam track by providing means to automatically compensate for wear of the cam track and the rollers; and to provide a split double-ended piston of the character described which is simple in construction, automatic in operation and relatively simple to manufacture.

An illustrative embodiment of this invention is shown in the accompanying drawings, wherein:

Figure 1 is a broken elevational view of an engine, with parts shown in section.

Fig. 2 is an elevational view of a double-ended piston embodying the present invention, shown apart from the engine.

Fig. 3 is a side view of the double-ended piston shown in Fig. 2, one end of the piston being shown in cross section.

Fig. 4 is a cross-sectional view taken on the line 4—4 of Fig. 3.

Fig. 5 is a cross-sectional view taken on the line 5—5 of Fig. 3.

Referring in detail to the drawings, the engine block embodies a pair of separable sections 1 and 2, having corresponding annular abutment flanges 3 and 4 respectively formed integrally therewith at their inner ends and which flanges are releasably fastened together by bolts, not shown, in the usual manner.

The engine block has a double-ended annular series of combustion cylinders 5 arranged in alined pairs disposed symmetrically around the drive shaft 6 and parallel therewith, the block units 1 and 2 being cast to include these and to provide the usual bearing supports, air passages, and a water jacket for the cylinders, as will be understood, and which are completely shown and described in my said copending application Serial No. 401,243. Each double cylinder 5 is provided with a double-ended piston 7. Each double-ended or headed piston 7 is made up of two parts 7' and 7" and are connected together as will hereinafter be more thoroughly described.

A lining 8 is disposed in each cylinder 5, the lining being of a length to extend between the longitudinally opposed cylinder ends and through the full length thereof so as to render the cylinders 5 more substantially continuous. These linings are provided with a pair of follower rollers 8' secured medially of the lining. The rollers 8' are adapted to ride in the cam track 8" of the wabble plate 9 to cause reciprocation of the lining within the cylinder ends. This is fully disclosed in my copending application Serial No. 448,989, filed June 29, 1942, for Engines. Since this feature does not form a part of this invention additional details are believed unnecessary.

The double-headed pistons 7 are structurally designed for coactive engagement with the wabble plate or cam 9 fixed on shaft 6. For this purpose each connective cylinder lining 8 is formed with a wall aperture 10 in its shaft-facing side, thus providing a clearance for said cam 9 where it engages the corresponding piston.

Each part 7' and 7" of the double-ended pistons 7 is provided with a wrist pin 12 mounted crosswise of the piston and radially as to shaft 6 in a bearing 13. The wrist pins serve as supports for the tapered rollers 14 which are mounted on the interposed cylindrical roller bearings 15. The rollers 14 contact opposite edges or sides of the cam track 15 of wabble plate 9 so that reciprocating movement of the pistons within their cylinders will act to impart rotary movement of the cam 9 and with it, the drive shaft 6 on which it is fixed.

Each part 7' and 7" of the double-ended piston is provided with shoulders 27 and 28 respectively which are each bored to provide apertures 17 and 18 respectively which, when the inner ends of the parts 7' and 7" are placed together, the apertures 17 and 18 respectively are in alinement with each other and headed bolts 19 and 20 are readily insertable therethrough. Each of the bolts 19 and 20 is provided with the usual nuts 21 and 22 respectively, and locking nuts 23 and 24 respectively. Each of the bolts 19 and 20 is also provided with spring washers 25 and 26 respectively. The washers 25 and 26 lie between the shoulders 27 and 28 respectively and the inner face of the bolt heads. It will readily be seen that when the bolts 19 and 20 are drawn up the rollers 14 of piston parts 7' and 7" will be drawn into frictional contact with the cam track 16 of the wabble plate 9.

It can also readily be seen that because of the yieldability and resiliency of the springs 25 and 26 positive frictional contact between the rollers 14 and the cam track 16 is had at all times. The individual ends 7' and 7" of the piston 7 will also have a tendency to expand and contract if, for instance, the thickness of the cam track is not uniform throughout its entire area after machining or if the cam track does not wear out uniformly throughout its entire surface. This is also true if any temperature changes occur in the metal of the wabble plate 9 and its cam track 16, or in the rollers 14. It can also readily be seen that the rollers 14 will contract towards each other to automatically compensate for both wear of the cam track 16 and of the rollers 14 because of the resiliency of piston parts 7' and 7" and the tendency of the spring washers 25 and 26 to draw the same together. Therefore, no manual adjustment of the bearings and rollers is required as had heretofore been necessary when any wear has taken place. Also the wabble plate had to be removed from the engine to resurface the cam tracks when the cam tracks wore out unevenly since no provision had been made heretofore to automatically compensate for such uneven wear.

Although but one specific embodiment of the invention is herein shown and described, it will be understood that numerous details may be altered or omitted without departing from the spirit of the invention as defined by the following claims.

I claim:

1. In a double-headed split piston having two separable sections, means for securing said sections together in end-to-end relationship and in axial alinement with each other, and yielding means carried by said securing means whereby said individual sections are arranged to expand and contract axially with respect to each other, under varying conditions.

2. In a device of the class described, a pair of pistons adapted to abut together in end-to-end relationship to form a single double-headed piston, a plurality of means to secure said pistons together in axial alinement with each other, and means carried by said securing means to allow for expansion and contraction of each of said individual pistons with respect to each other.

CHARLES N. KAHL.